United States Patent [19]

Gilbert

[11] 3,998,000
[45] Dec. 21, 1976

[54] ELECTROCUTION TRAP FOR INSECTS

[76] Inventor: Donald E. Gilbert, 101 Chestnut St., Jonesboro, Ark. 72401

[22] Filed: Aug. 4, 1975

[21] Appl. No.: 601,268

[52] U.S. Cl. .................................................. 43/112
[51] Int. Cl.² .......................................... A01M 1/22
[58] Field of Search ............................. 43/112, 113

[56] References Cited
UNITED STATES PATENTS

| 1,852,923 | 4/1932 | Folmer et al. | 43/112 |
| 3,768,196 | 10/1973 | Iannini | 43/112 |
| 3,894,351 | 7/1975 | Iannini | 43/112 |

Primary Examiner—Warner H. Camp
Attorney, Agent, or Firm—Hill, Gross, Simpson, Van Santen, Steadman, Chiara & Simpson

[57] ABSTRACT

A trap for flying insects adapted for corner mounting has black-light fluorescent tubes adjacent opposite sides of an electrocution grid within a housing and diffusing reflective panels are positioned behind the fluorescent tubes to reflect rays of light beyond the light sources and through an open side of the housing. A translucent diffusing panel extending across the open side of the housing has gridded openings on opposite sides thereof. Insects attracted to the light approach the light source where they will encounter the electrocution grid or may land upon the translucent panel, from which they may also crawl through the gridded openings.

15 Claims, 6 Drawing Figures

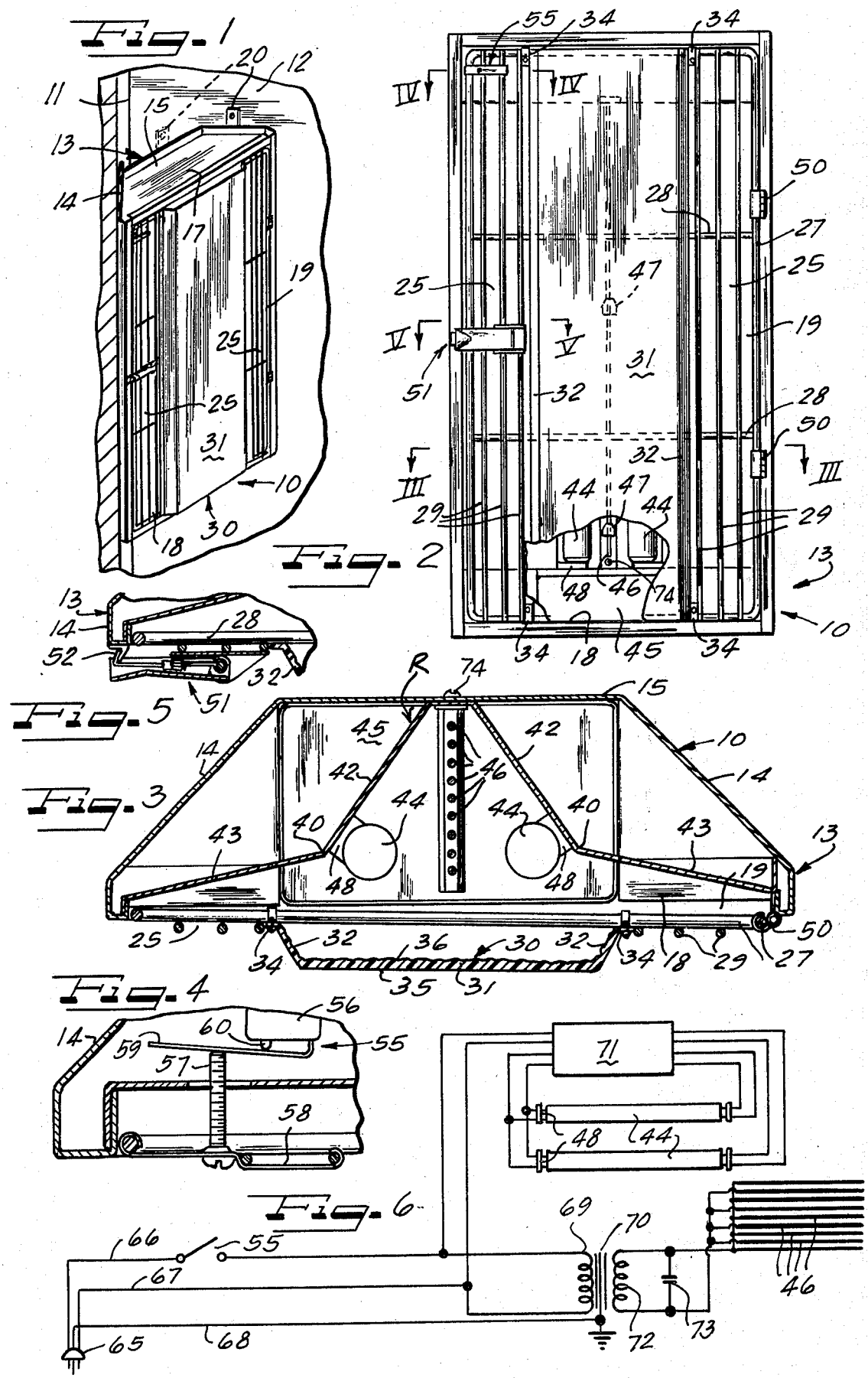

ELECTROCUTION TRAP FOR INSECTS

BACKGROUND OF THE INVENTION

1. Field of the Invention

The invenion relates to insect control means by illuminated electrocution traps.

2. The Prior Art

Illuminated electrocution traps for flying insects are well known in the art. U.S. Pat. No. 3,491,478 discloses a trap having an electrocution grid between a light source and a combination baffle and a pitted, anodized aluminum diffusing surface which deflects the flying insects onto the grid.

SUMMARY OF THE INVENTION

An insect electrocution trap in a housing having an open side has a pair of narrow, vertically disposed grill or gridded openings spaced apart transversely across an open side of the housing. A translucent diffusion panel is disposed across the entire center portion of the open side of the housing between the grill openings. The translucent diffuser panel isolates the insect electrocution grid from accidental human contact, allowing placement of the unit in location accessible to the public. A light source and an electrocution grid are disposed behind the translucent panel within the housing and between a pair of angled, reflective diffusion panels. The shape of the housing readily fits into a corner. Insects, and particularly flies, attracted to the light land on the translucent diffusion panel and crawl into the trap through the gridded openings. Insects may also fly into the trap directly through the grill openings.

BRIEF DESCRIPTION OF THE DRAWINGS

FIG. 1 is a general perspective view of an insect trap of the present invention installed in a corner of a walled space.

FIG. 2 is a plan view of the insect trap from the front, partially cut away.

FIG. 3 is a transverse sectional view of the insect trap, on line III—III of FIG. 2.

FIG. 4 is a sectional detail view on line IV—IV of FIG. 2.

FIG. 5 is a sectional detail view on line V—V of FIG. 2.

FIG. 6 is a schematic view of the electrical circuitry of the insect trap device.

DESCRIPTION OF THE PREFERRED EMBODIMENT

An insect electrocution trap 10 is shown generally in FIG. 1 mounted adjacent the corner of two walls 11 and 12 of a space in which insects are to be controlled. The bottom of the unit should be from 12 to 24 inches from floor level, and the device has an effective range from its mounting location of from 5 to 24 feet for flies of different species and 5 to 300 feet for nocturnal flying insects. The insect trap 10 generally comprises a housing 13 having rear walls 14, 14, and 15, top and bottom walls 17, and 18, and an open front side 19. As shown in FIG. 3, the rear walls 14, 14 are formed at substantially a 45° angle from the rear wall 15, so that the unit 10 may be mounted either upon both walls 11 and 12 near a corner thereof as shown in FIG. 1 or flat upon either of walls 11 or 12 by surface 15 alone using brackets 20.

The open front side of the housing 19 is fitted with first and second grills shown generally at 25, 25 and comprising elongated narrow vertically disposed gridded openings on opposite transverse extremities of the housing 19. These grills 25, 25 comprise a support wire 27 about the periphery of the opening 19 and a pair of transverse supporting wires 28, 28 joining the longitudinal lengths of the wire 27. Parallel filler wires 29 are spaced apart between the longitudinal support wires 27 and a central zone between the two grilled openings 25, 25. The wires 27, 28 and 29 are conveniently joined into a strong grill work by welds at the junctions thereof.

In accordance with this invention an extensive central zone is disposed between the grilled openings 25, 26 and is covered by a translucent panel member 30 having a flat projecting portion 31 and side portion 32, 32 which engage the transverse supporting members 28 and are affixed to the peripheral support wire 27 at the longitudinal ends of the panel 31, by means of brackets 34. It is contemplated in accordance with the principles of the present invention that the panel 30 has an included planar surface which is at least as great in area as the combined area of the two grills. Both the panel 30 and the projecting portion 31 and the side walls 32, 33 may be constructed of a clear plastic if so desired. The panel 30 has a smooth outer surface 35 and a mottled inward surface 36 which diffuses rays of light passing through the panel 30.

Within the housing 19 there is disposed a reflector R aligned generally behing the light sources and comprising two pairs of diffusing reflective panels 40, 40. Each panel comprises an inner diffuser 42 and an outer diffuser 43. The outer diffusers 43, 43 generally lie behind the grilled openings 25, 25, while the inner diffusing panels 42, 42 join the outer panels 43, 43 to the rear wall 15 of the housing 13 beind the translucent panel 30. A pair of fluorescent tubes 44, 44 are supported by sockets 48, 48 and lie parallel to and forwardly of the inner diffusing panels 42. These fluorescent tubes 44, 44 are selected to provide proper wave lengths of light to attract selected insects such as flies. Sylvania F20T12-BL 40 watt black light tubes have been found to give good results. These tubes 44 extend substantially the entire length of the housing 13. An insect carcass container tray 45 is placed at bottom of the trap 10 upon the bottom wall 18.

Extending longitudinally down the center of the housing 13, between the fluorescent tubes 44, 44 and the inner diffusing panels 42, 42 is a series of electrocution wires 46 spaced apart and supported by insulating posts 47 spaced along the length of the wires 46. The wires 46 are spaced closely enough together to allow arcing contact between adjoining wires by a target insect so that high voltage between the adjoining wires will send a current through the body of the insect, electrocuting and dehydrating same.

The grill portions 25, 25 and the panel 30 are conveniently hinged across the open side 19 of the housing 13 by means of hinges 50, 50 engaging the longitudinal portion of peripheral wire 27 on one side of the housing 13 and by a clamp means 51 opposite thereto. The clamp means 51 acts between parallel filler wires 29 of the grill 25 and a bracket 52 affixed to the housing 13 adjacent the open side 19 thereof. Since the electrocution grid 46 is exposed whenever the grills 25, 25 in the panel 30 are rotated away from the open side 19 of the housing 13, a safety cut-off switch assembly 55 is provided in an upper corner of the unit. The cut-off switch means 55 comprises a switch 56 which is normally open but which is closed when a pin 57 affixed to the grill 26 by means of the plate 58 contacts an arm 59 which pivots on the switch 56 to actuate a lever 60. Thus, when the grill 26 is closed, the system may operate, while opening of the grill will break the circuit through the switch 56.

An electrical schematic wiring diagram for the insect trap 10 is shown in FIG. 6. A line cord 65 brings AC current into the unit 10 on lines 66 and 67, with a grounding wire 68. One side 66 of the power line 65 passes through the safety switch 55 and connects both to a primary coil 69 of the transformer 70 and to a ballast device 71 which activates the fluorescent tubes 44. Both the ballast 71 and the primary coil 69 of the transformer 70 are connected to the second input line 67. The output coil 72 of the transformer 70 is rated at 4000 volts and 9 milliamperes. Each side of the secondary coil 72 is connected to alternate wires 46 of the electrocution grid as shown, so that a high voltage potential exists between adjacent wires. A capacitor 73 across the output wires of the secondary coil 72 suppresses voltage level fluctuations across adjacent wires of the grid 46. Such suppression retards the increase in voltage back to normal levels after an insect has short-circuited the grid 46 with its body, to break the arc between adjoining wires through the body of the insect and to allow the insect carcass to fall free of the wires and into the container 45.

It is also a feature of the present invention that all the electrical components of the device are mounted upon the reflector panels 40, 40 and the panels 40, 40 are in turn retained in the housing by a single screw 74. Removal of the screw 74 permits lifting or sliding from the housing all of the operating parts for servicing or replacement.

In accordance with the principles of the present invention, the reflective diffusing panels 40 and 41 may be formed of a commercially available material known as satin finish Kote-Alume, a proprietary product of th American Nickeloid Company, or equivalent. The panels 40 and 41 together with the translucent diffusing panel 30 limits the escape of direct, undiffused light from the fluorescent tubes 44 from the housing 13. It has been found that diffused light is much more effective in attracting flying insects than is direct, undiffused light of any wave length, so the light output of the present device has unusual effectiveness. The translucent panel 30 affords an extensive translucent landing surface for flying insects, and especially flies, since the panel 30 forms an illuminated window. Insects such as flies alighting thereupon crawl across the surface 35 to an edge thereof, from which they will enter the interior of the housing about the lamps 44 and the electrocution grid 46. Upon engaging any two wires in the grid 46, the 4000 volt potential thereacross will cause an arc to jump the gap between the wires 46 through the body of the insect, electrocuting the insect and evaporating its body fluids. The arc also reduces the voltage across the secondary coil 72 of the transformer 70 until it extinguishes itself. The capacitor 72 then retards the build-up of voltage across the coil 72, allowing the insect carcass to drop free of the grid. Whenever the interior of the housing 13 requires cleaning, or the carcass trap 45 is full, the grills 25, 25 and the panel 30 thereon may be swung away from the housing 13 to afford access. Withdrawal of the pin 57 on the grill 25 opens the switch 56 breaking the circuit between input lines 66 and 67 and deactivating both the lamps 44 and the grid 46.

Although various minor modifications might be suggested by those versed in the art, it should be understood that I wish to embody within the scope of the patent warranted hereon all such modifications as reasonably and properly come within the scope of my contribution to the art.

I claim as my invention:

1. A corner mounted insect trap comprising,
    a vertically disposed light source having reflective surfaces positioned therebehind and having an open-sided enclosure through which light rays are projected and reflected,
    said enclosure having angularly disposed rear walls adapted for corner mounting on adjoining wall surfaces,
    a flat panel formed of translucent material and extending across substantial portions of the open side of said enclosure to form an illuminated window closure intercepting the projected and reflected light rays for attracting insects,
    said panel being sized of a lesser width than said open side to form elongated vertical transversely spaced apart openings on opposite sides of said flat panel and through which insects may enter the enclosure behind the panel,
    and a killing grid inside of the enclosure adjacent the light source for electrocuting the insects.

2. An insect trap comprising,
    enclosure means having an elongated open side,
    a flat panel formed of translucent material in said enclosure means extending across said open side but having transversely spaced narrow openings on opposite transversely spaced sides of said panel,
    a light source behind said panel,
    a killing grid in said enclosure means, and
    a reflector behind said light source in said enclosure to collect and reflect rays of light from said light source past said light source and outwardly through said panel,
    whereby insects and particularly flies are attracted to said panel when illuminated by said light source and enter the enclosure means through said openings on opposite sides of said panel.

3. An insect trap as defined in claim 2, and grids extending across said openings to form grills adjacent the longitudinal edges of said translucent panel through which insects may enter the enclosure means.

4. An insect trap comprising,
    a killing grid extending in a vertical disposition and adapted to be connected to a source of electrical energy for electrocuting insects contacting the grid,
    an elongate light source on each side of said grid projecting rays of light in a range of wave lengths adapted to attract insects,
    a reflector positioned generally behind said light sources and including a pair of inner panels disposed at an acute angle with respect to one another and a pair of outer panels extending respectively outwardly of said inner panels,
    enclosure means having an open-side extending forwardly of said reflector and enclosing said reflector, said light sources and said grid,
    hinge means and latch means connected to said enclosure means and disposed at opposite sides of said open-side,
    and a panel means connected to said hinge means and said latch means and extending across said open side, said panel means comprising a panel made of translucent material and forming a window closure across said open side to intercept light rays projected from said light sources and reflected by said reflector to attract insects and especially flies, said panel means having narrow elongated openings on opposite sides of said translucent panel and through which insects enter the enclosure means to engage the killing grid.

5. An insect trap as defined in claim 4 and a safety switch in circuit with said grid and actuated by said panel means only when in closed latched position.

6. An insect trap as defined in claim 4 and a grid forming a grill over each of said elongated openings.

7. In an insect trap comprising an elongate light source mounted in a housing which contains insect electrocution means and reflective diffusion panels adjacent said light source, the improvement comprising:

a pair of grilled openings on said housing extending parallel to said light source adjacent said reflective panels and being spaced apart transversely so that said openings are separated by a middle space therebetween; and a translucent diffusion panel disposed across and closing said middle space and having an extent and position to diffuse light emitted from said source.

8. In an insect trap as defined in claim 7, said translucent diffusion panel comprising a clear plastic panel having a mottled inward surface.

9. In an insect electrocution trap as defined in claim 7, said elongate light source comprises two parallel fluorescent tubes and said insect electrocution means comprises an electric grid spaced between said tubes.

10. An insect electrocution trap having a light source, opaque diffusion panels for reflecting light emitted by said source, and insect electrocution means in a housing having an open side, wherein:

said open side has first and second grills thereover, each grill having longitudinal and transverse bars spaced apart sufficiently to allow target insects to pass therethrough, and said first and second grills being spaced apart transversely from one another and separated from one another by a central zone immediately adjacent and overlying said light source and electrocution means; and translucent panel means between said first and second grill openings closing said central zone but diffusing light emitted from said source out from said housing.

11. An insect electrocution trap as defined in claim 10, wherein said translucent panel means comprises a plastic panel.

12. An insect electrocution trap comprising:

a housing having an open side;

a pair of spaced, parallel fluorescent lamp tubes in said housing;

an electrocution grid fixed parallel to said tubes and spaced therebetween;

first and second reflective diffusion panel means spaced from said tubes on either side thereof opposite said grid and angled from a plane containing said tubes, to direct diffused light from said tubes from said housing through the open side thereof;

first and second transversely space-apart grill means on said open side of said housing adjacent and overlying said reflective panel means and parallel to said tubes; and a translucent diffusion panel disposed between said grill means and closing said open side of said housing adjacent and overlying said grid and tubes, said translucent panel diffusing light from said tubes to attract insects.

13. An insect electrocution trap as defined in claim 12, wherein said translucent panel is of clear plastic with a mottled surface interiorly toward said tubes.

14. An insect trap as defined in claim 4, wherein said enclosure means comprises rear walls disposed at an angle so that said trap is adapted for corner mounting.

15. An insect trap as defined in claim 4, wherein said reflector is attached to said enclosure means by a single screw and said reflector carries thereon said killing grid and said light source for convenient removal thereof for servicing.

* * * * *